United States Patent
Fukasawa

(10) Patent No.: US 8,498,025 B2
(45) Date of Patent: Jul. 30, 2013

(54) IMAGE READER AND METHOD OF READING IMAGE

(75) Inventor: Ryuji Fukasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 676 days.

(21) Appl. No.: 12/591,697

(22) Filed: Nov. 30, 2009

(65) Prior Publication Data

US 2010/0157385 A1  Jun. 24, 2010

(30) Foreign Application Priority Data

Dec. 22, 2008  (JP) .................. 2008-325083

(51) Int. Cl.
*H04N 1/04* (2006.01)
*G06K 15/00* (2006.01)
*G06K 9/60* (2006.01)
*G06F 3/12* (2006.01)
*G03G 15/00* (2006.01)
*B65H 7/02* (2006.01)
*G03B 27/62* (2006.01)

(52) U.S. Cl.
USPC ......... 358/474; 358/475; 358/1.12; 358/1.13; 399/372; 399/367; 399/16; 399/376; 399/86; 271/259; 355/75; 382/306

(58) Field of Classification Search
USPC .................. 358/474, 1.12, 498; 399/372, 367, 399/16, 86; 271/259; 355/75; 382/306
See application file for complete search history.

(56) References Cited

U.S. PATENT DOCUMENTS

| 5,920,381 | A  | * | 7/1999  | Katsuta ......................... 271/259 |
| 6,661,933 | B1 | * | 12/2003 | Hisatomi et al. .............. 382/306 |
| 2007/0285697 | A1 | * | 12/2007 | Ebina et al. .................. 358/1.12 |
| 2008/0239414 | A1 | * | 10/2008 | Misu ............................ 358/498 |

FOREIGN PATENT DOCUMENTS

| JP | A-08-023420 | 1/1996 |
| JP | A-11-088615 | 3/1999 |
| JP | A-2007-259161 | 10/2007 |

* cited by examiner

*Primary Examiner* — Charlotte M Baker
*Assistant Examiner* — Rury Grisham
(74) *Attorney, Agent, or Firm* — Posz Law Group, PLC

(57) ABSTRACT

An image reader reads an image on a document while transporting it along a transport path. The image reader includes an image-reading unit, a document guide member and a size detector. The image-reading unit reads the image in a predetermined line width and generates image data based on the image. The document guide member is disposed along the document path and has a first mark thereon. The first mark extends in a main scanning direction of the image-reading unit and has a width greater than or equal to the predetermined line width. The size detector detects the size of the document based on image data read by the image-reading unit at a size detection position where the document overlaps with the first mark.

11 Claims, 12 Drawing Sheets

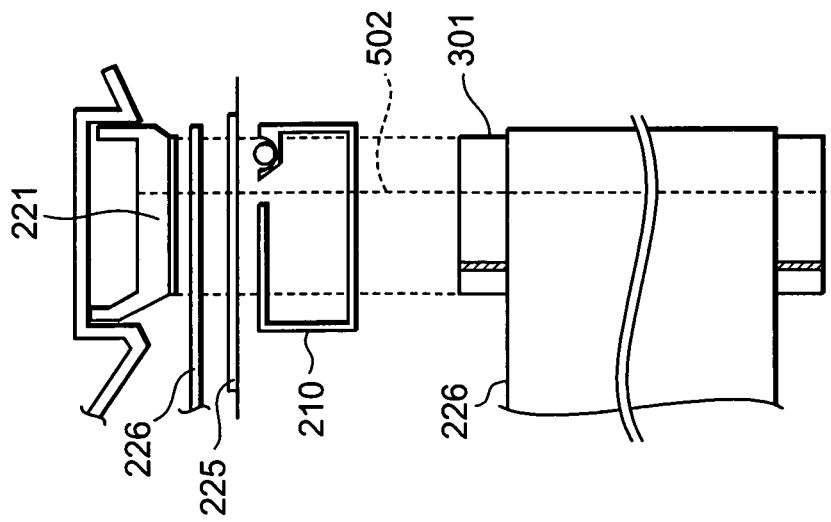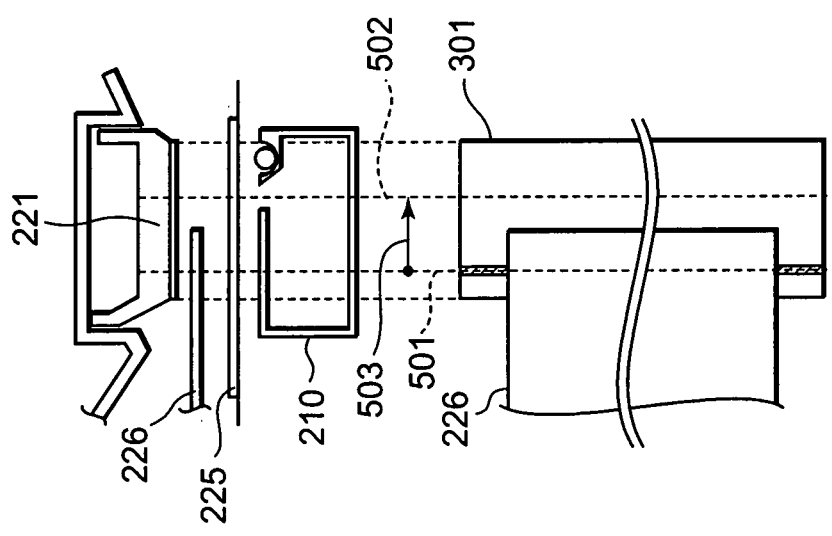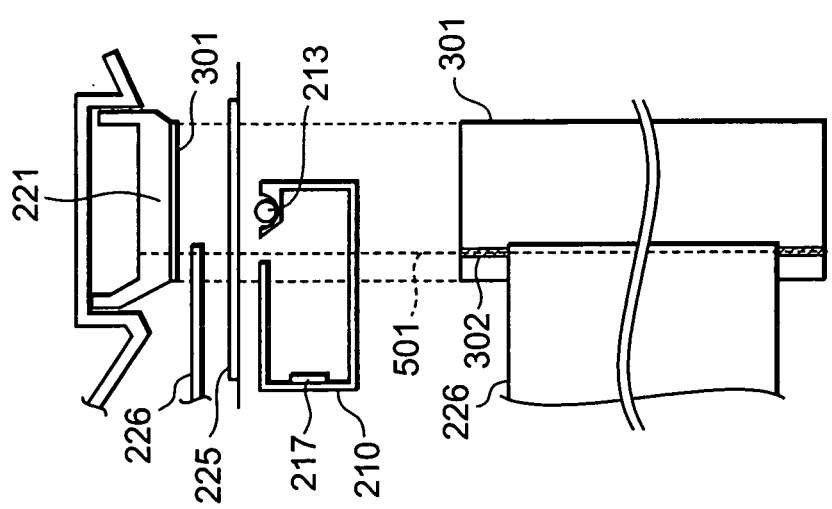

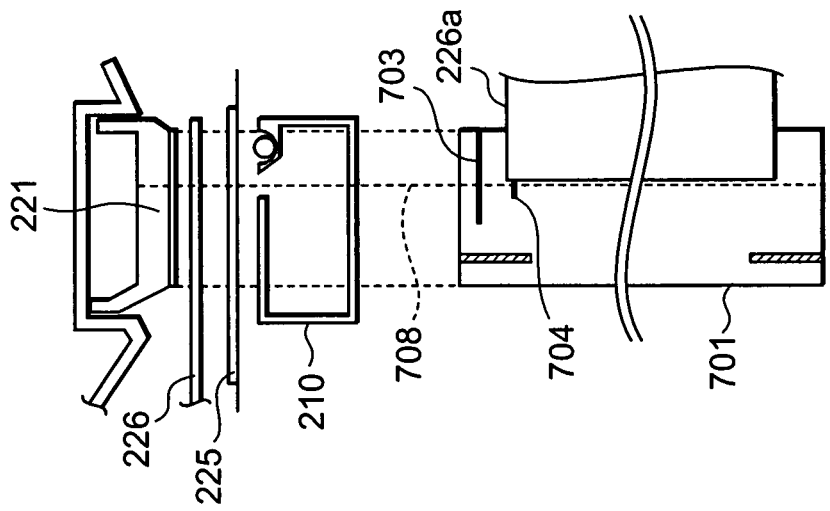
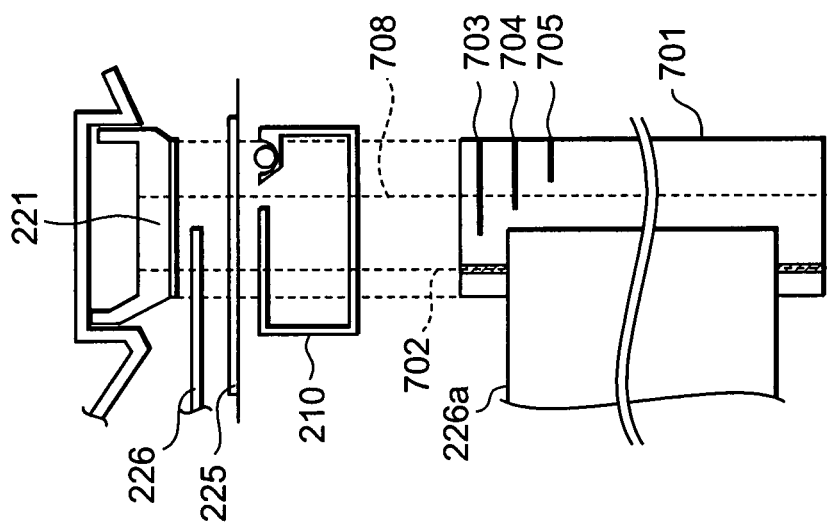
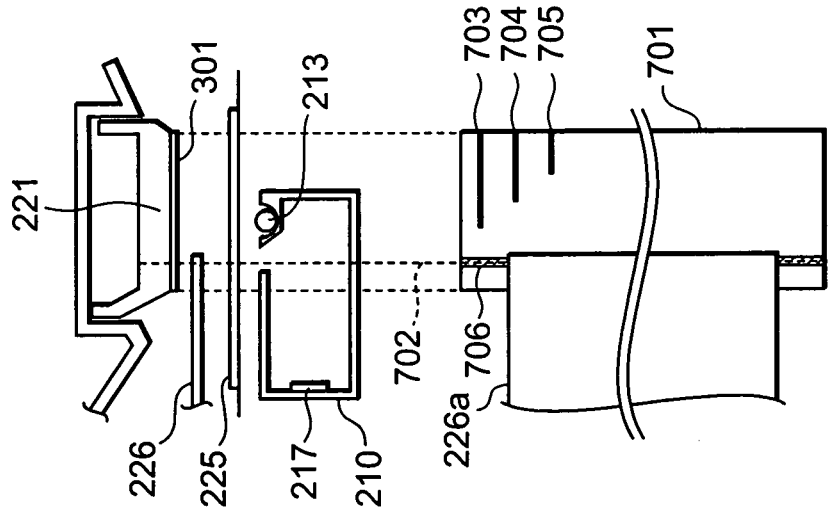

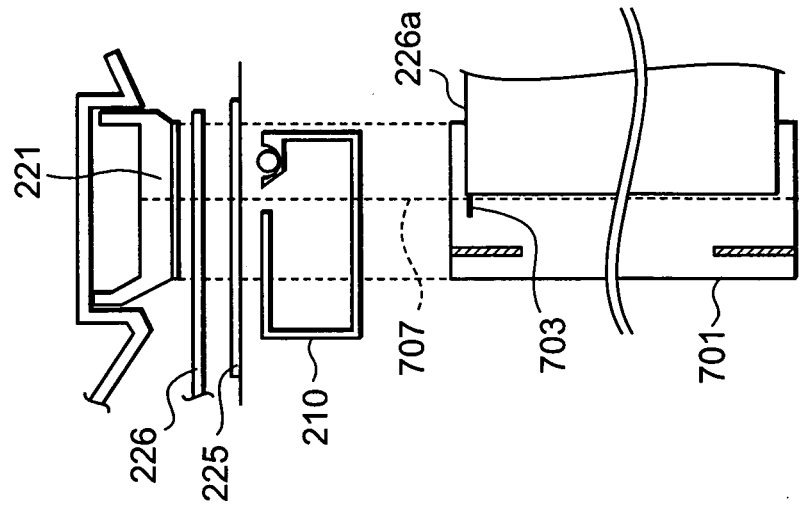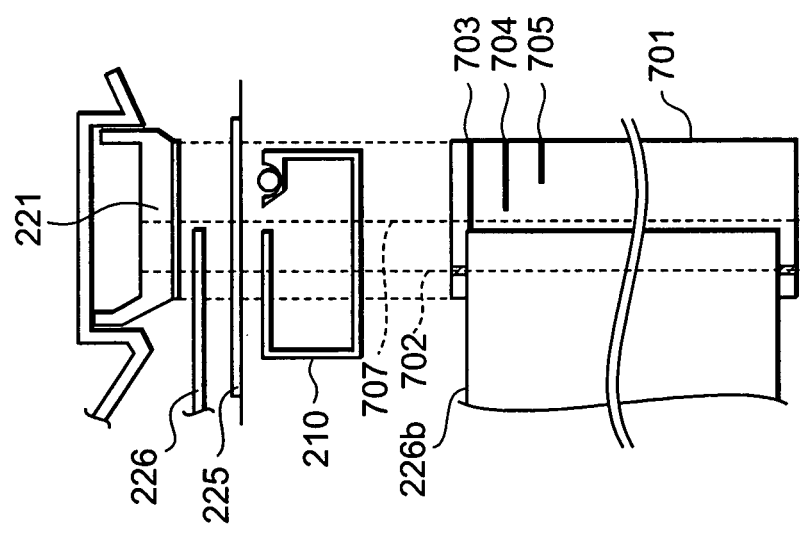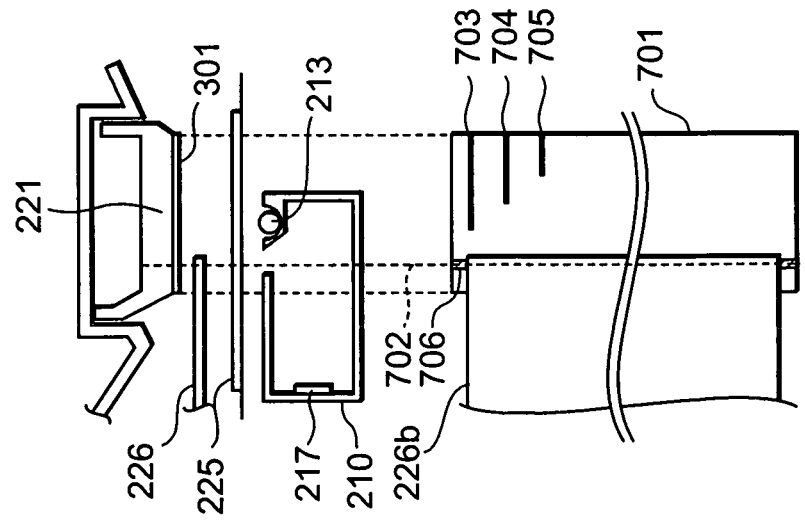

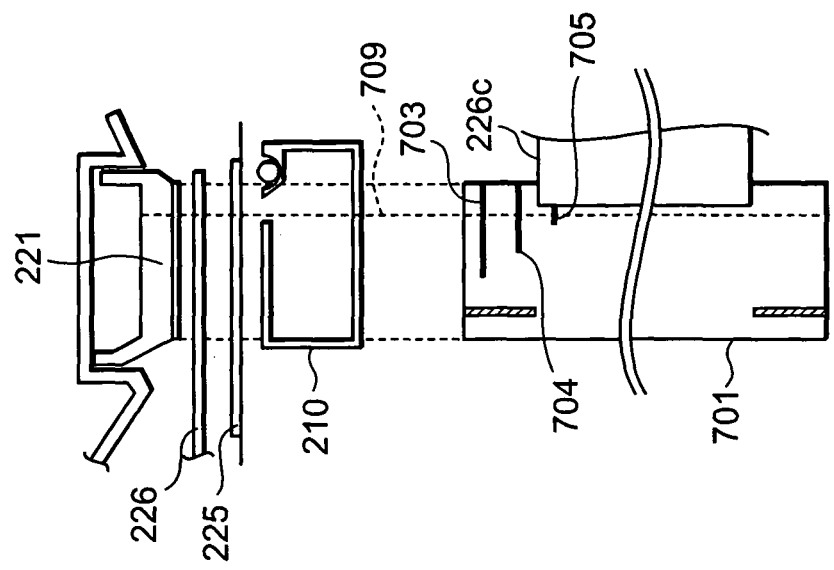
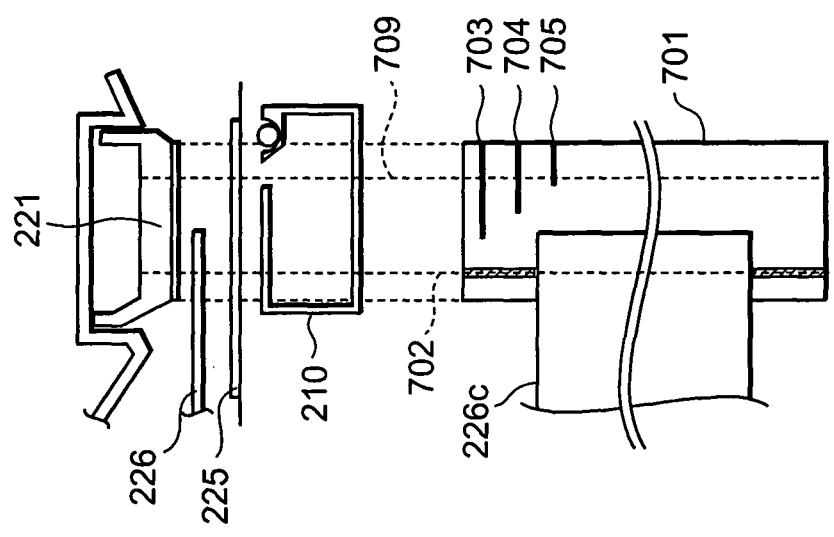
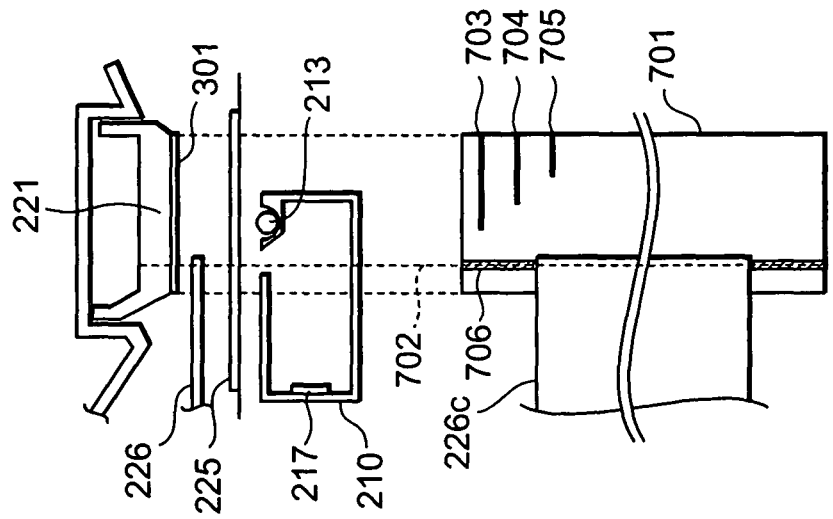

IMAGE READER AND METHOD OF READING IMAGE

CROSS-REFERENCE TO RELATED APPLICATION

This application claims priority under 35 USC 119 from prior Japanese Patent Application No. P 2008-325083 filed on Dec. 22, 2008, the entire contents of which are incorporated herein by reference.

BACKGROUND

This application relates to an image reader that reads an image on a document and generates image data on the basis of the image and a method of reading an image.

In an image reader that incorporates an automatic document feeder, such as a copier or a facsimile machine, a document placed on a document tray is automatically transported to an image-reading position, and is discharged from the image reader after an image on the document is read. Alternatively, in a flatbed-type image reader, a document is placed on a platen glass with a side to be read down, and an image of the document is read by an image-reading unit that moves under the platen glass.

These image readers have sheet sensors in the vicinity of a position where the document is placed. The sheet sensors detect the document placed on the document tray or the platen glass by a user, and the sheet size of the document is specified on the basis of a detection signal from the sheet sensors. Japanese Patent Laid-Open No. 11-088615 discloses one such image reader.

In the aforementioned image readers, however, a number of sheet sensors must be provided to specify various sheet sizes of documents. This will complicate the configuration of the image reader and cause an increase in production costs.

SUMMARY

An object of the application is to disclose an image reader and a method of reading image capable of specifying various sheet sizes of documents without increasing the number of sheet sensors.

An image reader reads an image on a document while transporting it along a transport path. The image reader includes an image-reading unit, a document guide member and a size detector. The image-reading unit reads the image in a predetermined line width and generates image data based on the image. The document guide member is disposed along the document path and has a first mark thereon. The first mark extends in a main scanning direction of the image-reading unit and has a width greater than or equal to the predetermined line width. The size detector detects the size of the document based on image data read by the image-reading unit at a size detection position where the document overlaps with the first mark.

In another aspect, a method of reading an image is performed by an image reader. The method includes, moving an image-reading unit to a size-detection position, overlapping a front end of a document with one or more first marks, scanning the one or more first marks and a portion of the image proximate to the one or more first marks and generating image data based on the portion of the image, determining a proportion of the one or more first marks not covered by the document based on the image data to a length of an effective image-reading range, and determining a sheet size of the document based on the proportion of the one or more first marks not covered by the document.

The full scope of applicability of the image reader and the method of reading image will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The image reader and the method of reading image will become more fully understood from the detailed description given herein and the accompanying drawings, which are given by way of illustration only, and thus do not limit the invention, and wherein:

FIGS. 5A to 5C are diagrams showing the positional relationship among a reading unit, a document and the special sheet of the first embodiment;

FIGS. 10A to 10C are diagrams showing the positional relationship among a reading unit, an A4 size document and the special sheet of the second embodiment;

FIGS. 11A to 11C are diagrams showing the positional relationship among the reading unit, an A3 size document and the special sheet of the second embodiment;

FIGS. 12A to 12C are diagrams showing the positional relationship among the reading unit, an A5 size document and the special sheet of the second embodiment.

DETAILED DESCRIPTION

Preferred embodiments of an image reader and a method of reading image according to the invention will be described in detail with reference to the accompanying drawings. In each embodiment, the description will be given with a scanner as an image reader.

It should be understood that the use of relational terms such as first and second, and the like, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order, i.e., processes or steps that are not so limited may be performed in any order.

First Embodiment

Figure 1:
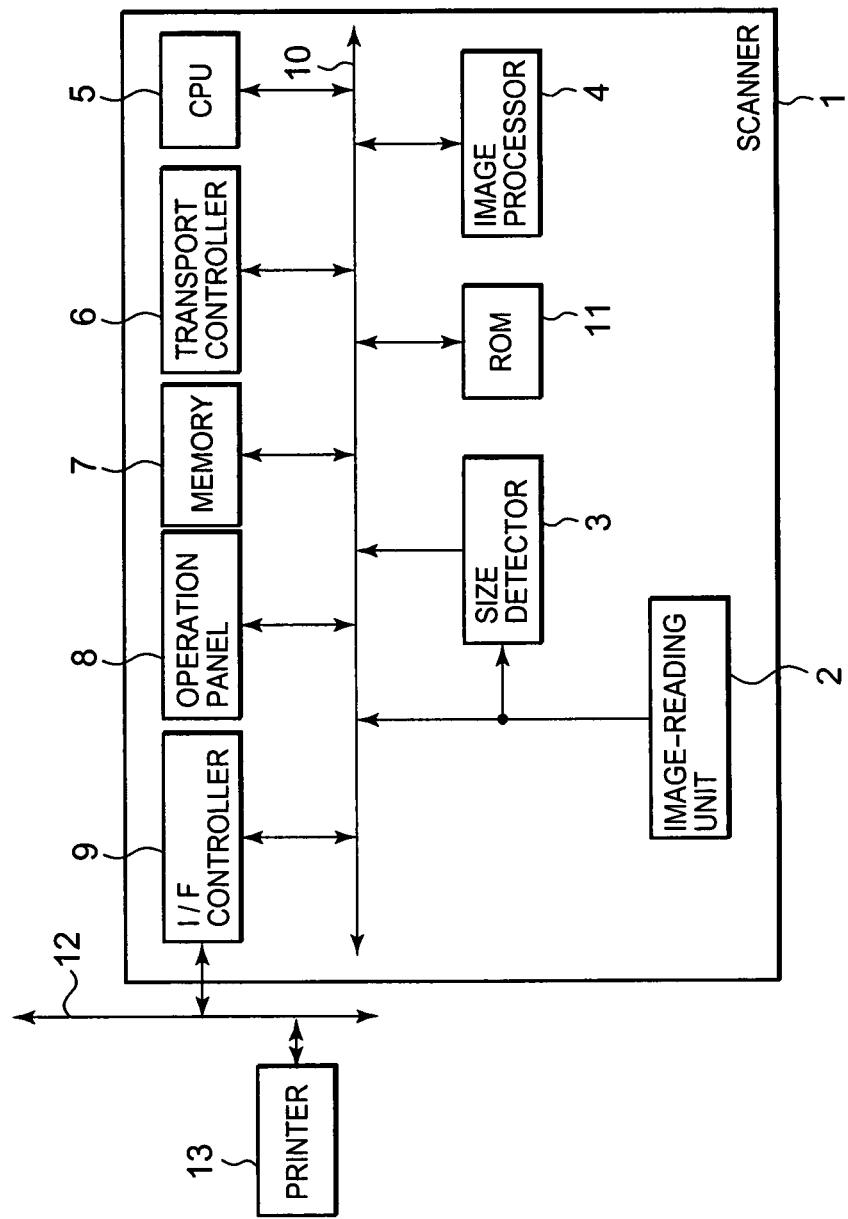
FIG. 1 is a functional block diagram of a scanner of a first embodiment.

FIG. 1 is a functional block diagram of a scanner 1 of a first embodiment, which incorporates an automatic document feeder described later. The scanner 1 reads an image on a document placed on a document tray while transporting it, and generates image data on the basis of the image.

Referring to FIG. 1, the scanner 1 may be connected with a printer 13 through a data transmission bus 12, which may consist of a universal serial bus (hereinafter, referred to as "USB") interface. The printer 13 may be an image-forming apparatus that has an electrophotographic print engine. The scanner 1 may include an image-reading unit 2, a size detector 3, an image processor 4, a central processing unit (hereinafter, referred to as "CPU") 5, a transport controller 6, a memory 7, an operation panel 8, an I/F controller 9, a bus 10 and a read only memory (hereinafter, referred to as "ROM") 11.

The image-reading unit 2 reads an image on a document and generates image data on the basis of the image. The size detector 3 detects the actual sheet size of the document to be read by comparing the image data generated by the image-reading unit 2 with size information corresponding to a number of possible sheet sizes that is stored in advance. The image processor 4 performs image processing, such as shading correction processing, compression processing or gamma correction processing, on the image data generated by the image-reading unit 2. The CPU 5 controls the entire scanner 1 in accordance with control programs. The transport controller 6 drives a first stepping motor 208 and a second stepping motor 223 according to control commands output from the CPU 5 on the basis of output signals from a document detection sensor 206 or a reading position sensor 207 described later. The memory 7, which may be a random access memory (hereinafter, referred to as "RAM"), temporarily stores the image data or control data therein. The operation panel 8 displays the status of the scanner 1. In addition, a user can input instructions to the scanner 1 through the operation panel 8. The I/F controller 9 controls data transmission and reception between the data transmission bus 12 and the scanner 1. The bus 10 is a data communication path through which the control commands from the CPU 5 or the image data generated by the image-reading unit 2 are transferred. The ROM 12, which is a nonvolatile memory, stores the control programs used by the CPU 5 for controlling the scanner 1. The above-mentioned elements work together to perform the functions of the scanner 1.

Figure 2:
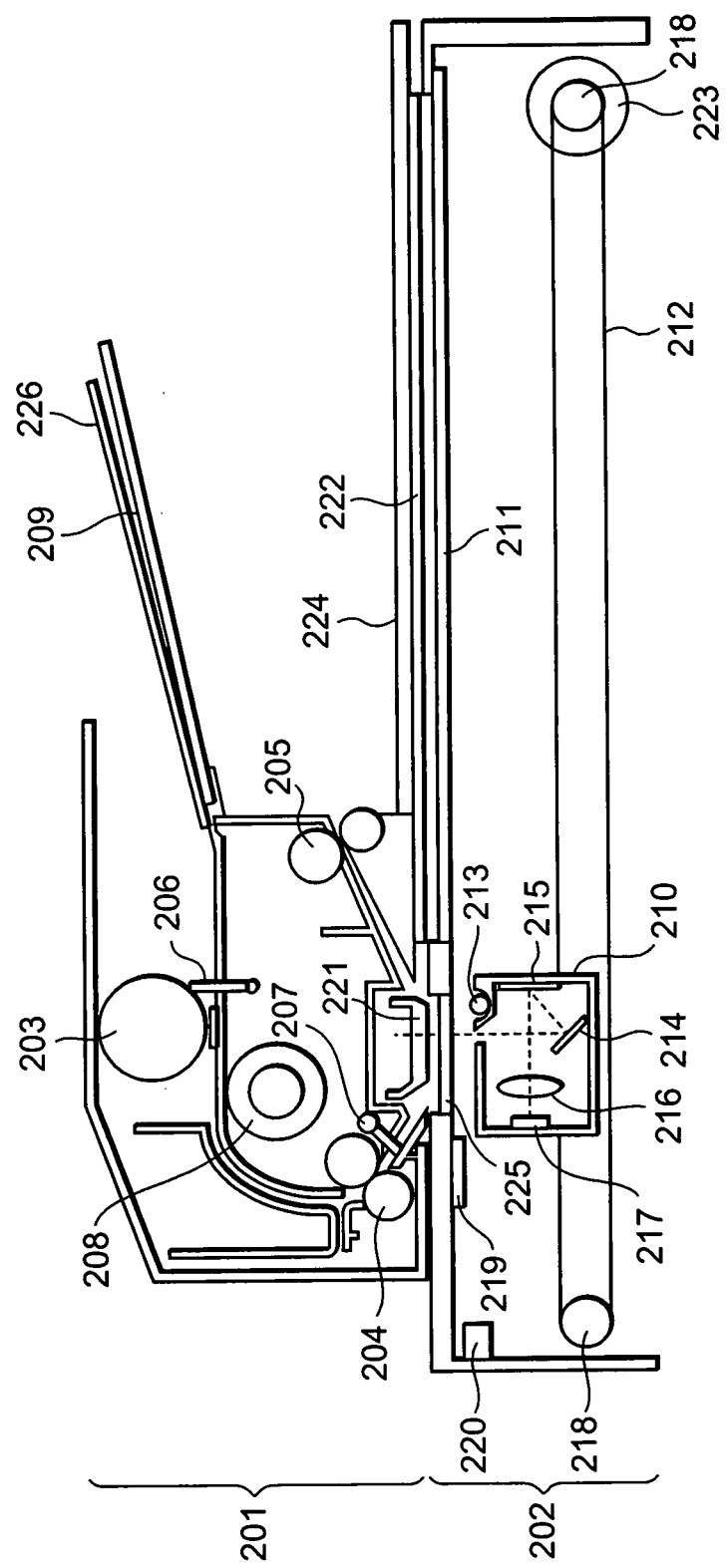
FIG. 2 is a schematic view of a main part of the scanner of the first embodiment.

FIG. 2 is a schematic view of a main part of the scanner 1, which includes an automatic document feeder 201 and a document reading unit 202. The automatic document feeder 201 is disposed on the document reading unit 202.

The automatic document feeder 201 may include a feed roller 203, a transport roller 204, a discharge roller 205, the document detection sensor 206, the reading position sensor 207, the first stepping motor 208, a document tray 209 and a document guide plate 221.

The feed roller 203 is rotated by the first stepping motor 208. The feed roller 203 picks up a document 226 one-by-one from a stack of documents 226 accommodated on the document tray 209 and feeds the document 226 toward the transport roller 204. The transport roller 204 is rotated by the first stepping motor 208 and further transports the document 226 fed from the feed roller 203 toward the discharge roller 205. The discharge roller 205 is rotated by the first stepping motor 208 and discharges the document 226 that has passed under the document guide plate 221 from the automatic document feeder 201.

The document detection sensor 206 detects the document 226 placed on the document tray 209 by the user and outputs a detection signal thereof. The document detection sensor 206 may be a contact sensor or a noncontact sensor. The reading position sensor 207 detects a front end of the document 226 transported toward the reading position 225 by the transport roller 204 and outputs a detection signal thereof. The reading position sensor 207 may be a contact sensor or a noncontact sensor. The first stepping motor 208 is driven by the transport controller 6. The driving force of the first stepping motor 208 is transmitted to the feed roller 203, the transport roller 204 and the discharge roller 205 through trains of gears (not shown). The document tray 209 accommodates a stack of documents 226, and is disposed so that the front end of the document 226 placed on the document tray 20 is to be detected by the document detection sensor 206.

The document guide plate 221, or a document guide member, is disposed along a transport path of the document 226, and allows the document 226 to always pass through the same position relative to a reading unit 210 described later. In other words, the document guide plate 221 maintains a constant distance between the reading unit 210 and the document 226. The document guide plate 221 is substantially rectangular and its length in a longitudinal direction, i.e., in a direction perpendicular to the transport direction of the document 226, is substantially the same as the length of a document pressure plate 224 in a traverse direction thereof. In addition, a special sheet 301 described later is attached on a surface of the document guide plate 221 that comes into contact with the document 226.

The document reading unit 202 may include the reading unit 210, a platen glass 211, a drive belt 212, pulleys 218, a white reference plate 219, a home position sensor 220, a white sheet 222, the second stepping motor 223 and the document pressure plate 224.

The reading unit 210 may include a light source 213, a first mirror 214, a second mirror 215, a lens 216 and a charge-coupled device (hereinafter, referred to as "CCD") image sensor 217. The light source 213 illuminates the document 226 placed on the platen glass 211. The light source 213 may be, but not limited to, a cold-cathode tube such as a molybdenum electrode that has features of a long life and low power consumption. The first and second mirrors 214 and 215 reflect light reflected from the document 226 in predetermined directions. The lens 216 focuses the light reflected from the first and second mirrors 214 and 215 on the CCD image sensor 217. The first mirror 214, the second mirror 215 and the lens 216 are disposed so that an image according to the light reflected from the document 226 is formed on the CCD image sensor 217. The CCD image sensor 217 converts the light focused by the lens 216 into electricity and generates electric signals in accordance with the image. The reading unit 210 scans the image on the document 226 placed on the platen glass 211 while moving along the platen glass 211 in conjunction with the movement of the drive belt 212 rotated by the second stepping motor 223, thereby generating image data corresponding to the image.

The platen glass 211 is substantially rectangular and has a surface on which the document 226 is placed. The drive belt 212, which is endless, is entrained about the pulleys 218 and is linked to the reading unit 210. By rotating in conjunction with the rotation of the pulleys 218, the drive belt 212 moves the reading unit 210 along the platen glass 211. The pair of pulleys 218 that stretches the drive belt 212 is rotated by the second stepping motor 223, thereby rotating the drive belt 212. The white reference plate 219 is read by the reading unit 210 to acquire reference sensor output data during the shading correction processing that is performed to reduce variations of output voltages from elements making up the CCD image sensor 217. The white reference plate 219 is disposed at a predetermined location outside of an image-reading range of the reading unit 210. In this embodiment, the white reference plate 219 is disposed upstream of the document guide plate 221 in the transport direction of the document 226.

The home position sensor 220 detects the reading unit 210 and outputs a detection signal thereof when the reading unit 210 is at its home position. The home position sensor 220 may be, but is not limited to, a light transmissive photointerrupter or a light reflective photointerrupter. The white sheet 222 is a light reflective sheet that is substantially rectangular and its area is almost the same as the document pressure plate 224. The second stepping motor 223 is driven by the transport controller 6 and the driving force thereof is transmitted to the pulleys 218. The document pressure plate 224 is allowed to be opened and closed by the user. The user opens the document pressure plate 224 to place the document 226 and closes the plate to read the image on the document 226. The document pressure plate 224 holds the document 226 on the platen glass 211 tightly together with the platen glass 211. The automatic document feeder 201 is mounted on the document pressure plate 224.

Figure 3:
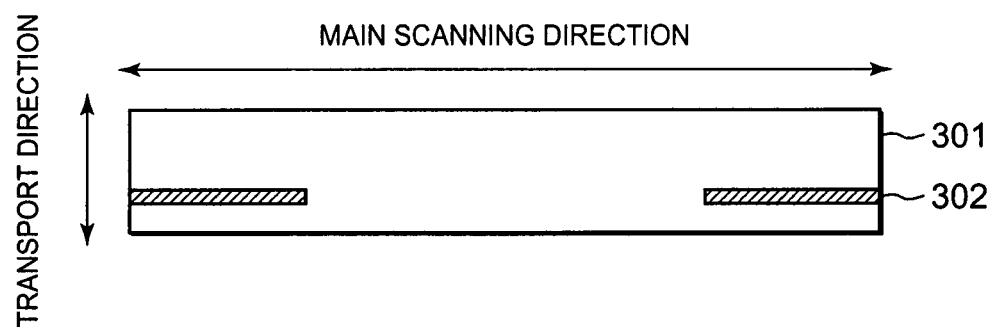
FIG. 3 is a plan view of a special sheet of the first embodiment.

FIG. 3 is a plan view of the special sheet 301, which is attached to the document guide plate 221. As shown in FIG. 3, marks 302 are formed on the special sheet 301. The marks 302 extend in the same direction as a main scanning direction of the reading unit 210 and the width of each of the marks 302 is greater than or equal to the width of a predetermined reading line of the reading unit 210.

Figure 4:
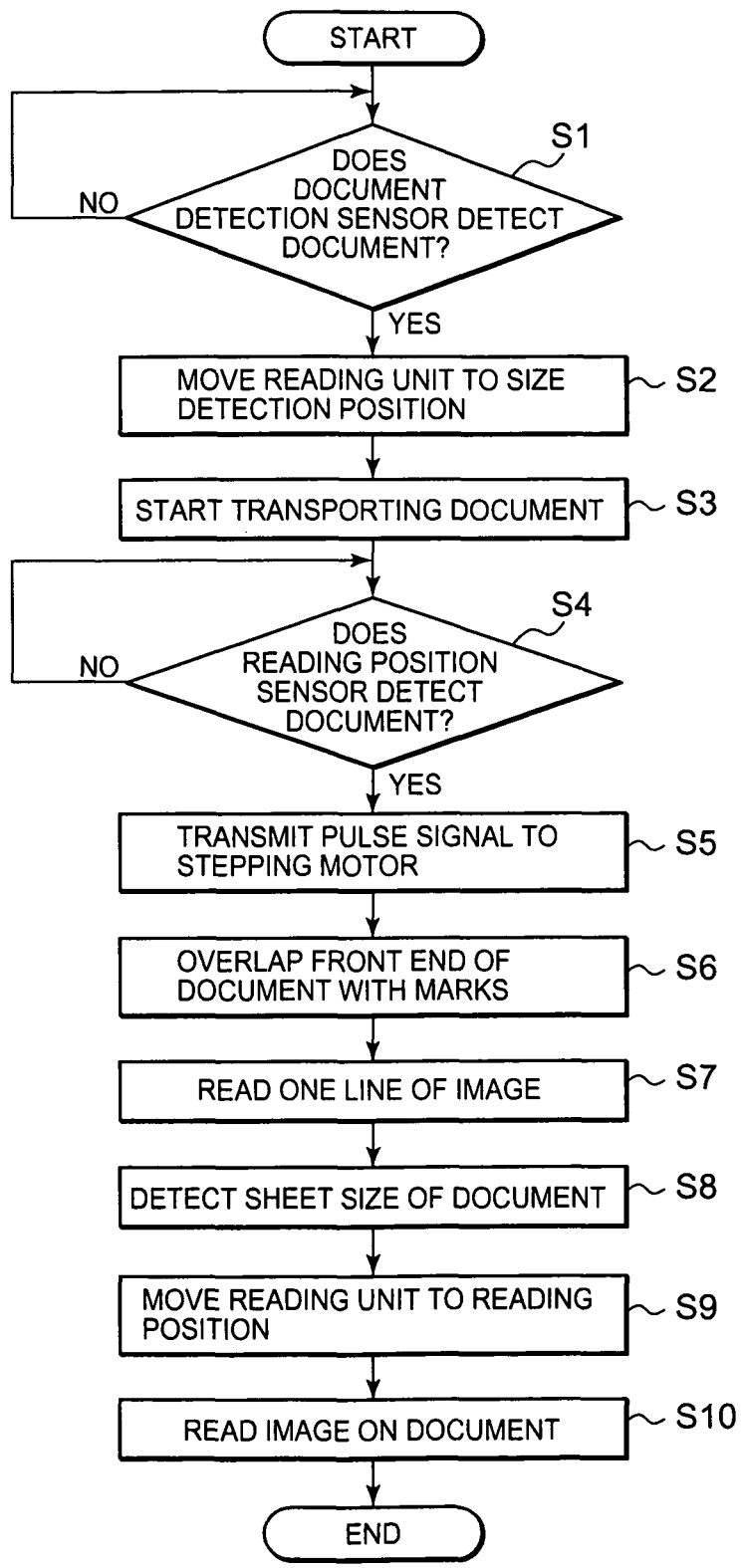
FIG. 4 is a flow chart of a sheet size detection operation of the scanner of the first embodiment.

Next, a sheet size detection operation of the scanner 1 will be described with reference to FIGS. 4 and 5. FIG. 4 is a flowchart of the sheet size detection operation of the scanner 1. FIGS. 5A to 5C are diagrams showing the positional relationship among the reading unit 210, the document 226 and the special sheet 301.

At S1, the CPU 5 determines whether or not the document detection sensor 206 detects a front end of the document 226. When the user places the document 226 on the document tray 209, the document detection sensor 206 detects the front end of the document 226 and transmits a detection signal to the CPU 5. Then, the process proceeds to S2. If the document detection sensor 206 does not detect the front end of the document 226, the process returns to S1.

At S2, upon receiving the detection signal from the document detection sensor 206, the CPU 5 commands the transport controller 6 to move the reading unit 210 to a size detection position 501 shown in FIG. 5A. The transport controller 6 transmits a pulse signal to the second stepping motor 223 to rotate the pulleys 218. The pulley 218 rotates the drive belt 212 and the reading unit 210 moves to the size detection position 501 in conjunction with the rotation of the drive belt 212.

At S3, when the user inputs a copy start instruction through the operation panel 8, the CPU 5 commands the transport controller 6 to begin transportation of the document 226. The transport controller 6 transmits a pulse signal to the first stepping motor 208 to rotate the feed roller 203. The feed roller 203 begins transporting the document 226.

At S4, the CPU 5 determines whether or not the reading position sensor 207 detects the front end of the document 226. When the reading position sensor 207 detects the front end of the document 226, the reading position sensor 207 transmits a detection signal to the CPU 5. Then, the process proceeds to S5. If the reading position sensor 207 does not detect the front end of the document 226, the process returns to S4.

At S5, upon receiving the detection signal from the reading position sensor 207, the CPU 5 commands the transport controller 6 to move the document 226 to a position where the front end of the document 226 overlaps with the marks 302 on the special sheet 301. The transport controller 6 transmits a pulse signal to the first stepping motor 208 to rotate the transport roller 204.

At S6, the transport roller 204 transports the document 226 to the position where the front end of the document 226 overlaps with the marks 302 on the special sheet 301. FIG. 5A shows a state where the front end of the document 226 has overlapped with the marks 302 on the special sheet 301.

At S7, the CPU 5 commands the image-reading unit 2 to read one line of the image (i.e., a portion of the image whose width is less than a width of the marks 302). The image-reading unit 2 controls the reading unit 210 to read the one line of image and generates one line of image data on the basis of the image read by the reading unit 210. The image-reading unit 2 transmits the image data to the size detector 3.

At S8, the size detector 3 detects the sheet size of the document 226 in the main scanning direction on the basis of the image data transmitted from the image-reading unit 2.

Here, a method of detecting the sheet size of the document 226 will be described in detail. As shown in FIG. 5A, the front end of the document 226 overlaps with the marks 302 at the size detection position 501. Therefore, pixel information of the image data corresponding to a region where the document 226 does not overlap with the marks 302 shows "black." That is to say, pixels in the region are continuously black from ends of the image-reading range. For example, assuming that the reading unit 210 reads the one line of image at a resolution of 600 dpi (dots per inch) and the number of black dots in the region where the document 226 does not overlap with the marks 302 is 1,700, the length Lb of the region in the main scanning direction is calculated as follows:

Lb=25.4 mm/600×1700=72.0 mm (2.83 inches).

For example, assuming that the length Le of an effective image-reading range of the reading unit 210 in the main scanning direction is 220 mm, the length Ld of the document 226 in the main scanning direction is calculated as follows:

Ld=Le−Lb=220 mm−72.0 mm=148.0 mm.

The size detector 3 compares size information on the document 226 calculated as just described with size information on standard paper, thereby detecting the sheet size of the document 226.

At S9, after the image-reading unit 2 generates the one line of image data, the transport controller 6 transmits a pulse signal to the second stepping motor 223 to rotate the pulleys 218. The pulley 218 rotates the drive belt 212 and the reading unit 210 moves to a reading position 502 shown in FIG. 5B in conjunction with the rotation of a drive belt 212. At this time, the transport controller 6 controls phases of the first stepping motor 208 and the second stepping motor 223 so that the reading unit 210 reaches the reading position 502 faster than the document 226. In FIG. 5B, a distance the reading unit 210 moves from the size detection position 501 to the reading position 502 is defined as a movement distance 503.

At S10, as shown in FIG. 5C, the image-reading unit 2 controls the reading unit 210 to read an image on the document 226 when the reading unit 210 reaches the reading position 502. Then, the image-reading unit 2 generates image data on the basis of the image.

As described above, in the first embodiment, the marks 302 are formed on the special sheet 301 attached to the document guide plate 221. The image-reading unit 2 reads image on the document 226 transported between the document guide plate 221 and the reading unit 210, and generates image data on the basis of the image. The size detector 3 detects the sheet size of the document 226 on the basis of the image data generated by the image-reading unit 2. Therefore, the scanner 1 is capable of specifying various sheet sizes of documents without increasing the number of sheet sensors.

Second Embodiment

A scanner 601 of a second embodiment differs from the scanner 1 of the first embodiment in that a size detector 602 and a special sheet 701 are used in place of the size detector 3 and the special sheet 301. The other elements are the same as those in the first embodiment. Therefore, elements similar to those in the first embodiment have been given the same numerals and their description is omitted.

Figure 6:
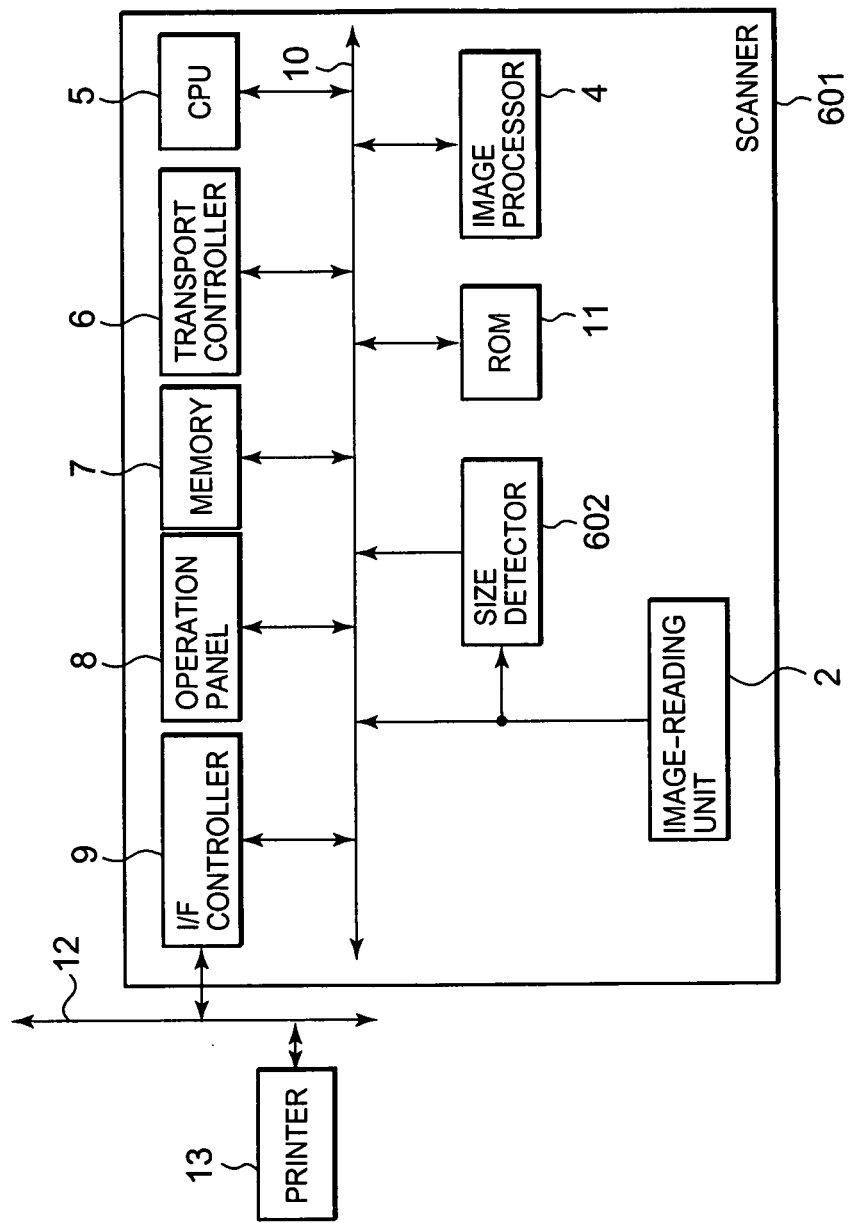
FIG. 6 is a functional block diagram of a scanner of a second embodiment.

FIG. 6 is a functional block diagram of a scanner 601 of the second embodiment, which includes the size detector 602 in place of the size detector 3 of the scanner 1.

Figure 7:
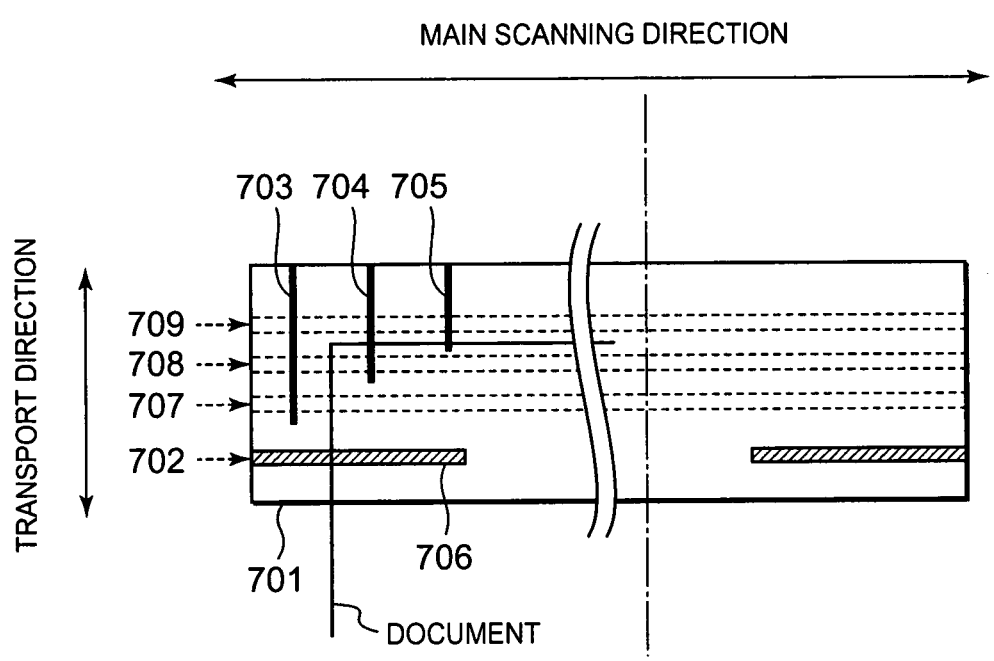
FIG. 7 is a plan view of a special sheet of the second embodiment.

FIG. 7 is a plan view of the special sheet 701, which is attached to the document guide plate 221 in the same way as the special sheet 301 of the first embodiment. Marks 706 are formed on the special sheet 701. The marks 706 extend in the same direction as the main scanning direction of the reading unit 210 and the width of each of the marks 706 is greater than or equal to the width of a predetermined reading line of the reading unit 210. Referring to FIG. 7, a size detection position 702 is a position where the reading unit 210 reads image to detect the sheet size of the document 226. Marks 703, 704 and 705 are used to detect a rear end of the document 226. The marks 703, 704 and 705 are arranged at predetermined intervals in the main scanning direction of the reading unit 210, and the lengths of them are different in the transport direction of the document 226, or in a sub-scanning direction, of the reading unit 210. Differences in length among the marks 703, 704 and 705 may be greater than or equal to the width of the reading line of the reading unit 210. That is to say, the mark 704 may be longer than the mark 705 by the width of the reading line or more, and the mark 703 may be longer than the mark 704 by the width of the reading line or more.

The marks 703, 704 and 705 are used to detect rear ends of documents that are different in size. For example, the mark 703 may be used to detect a rear end of a document of A3 size, the mark 704 may be used to detect a rear end of a document of A4 size, and the mark 705 may be used to detect a rear end of a document of A5 size. Therefore, the mark 703 is prepared at a position where the A3 size document overlaps with the mark 703 when the A3 size document is transported under the document guide plate 221. Similarly, the mark 704 is prepared at a position where the A4 size document overlaps with the mark 704 when the A4 size document is transported under the document guide plate 221, and the mark 705 is prepared at a position where the A5 size document overlaps with the mark 705 when the A5 size document is transported under the document guide plate 221.

In FIG. 7, a reading position 707 denotes a position where the reading unit 210 reads image of the A3 size document, a reading position 708 denotes a position where the reading unit 210 reads image of the A4 size document, and a reading position 709 denotes a position where the reading unit 210 reads image of the A5 size document.

Figure 8:
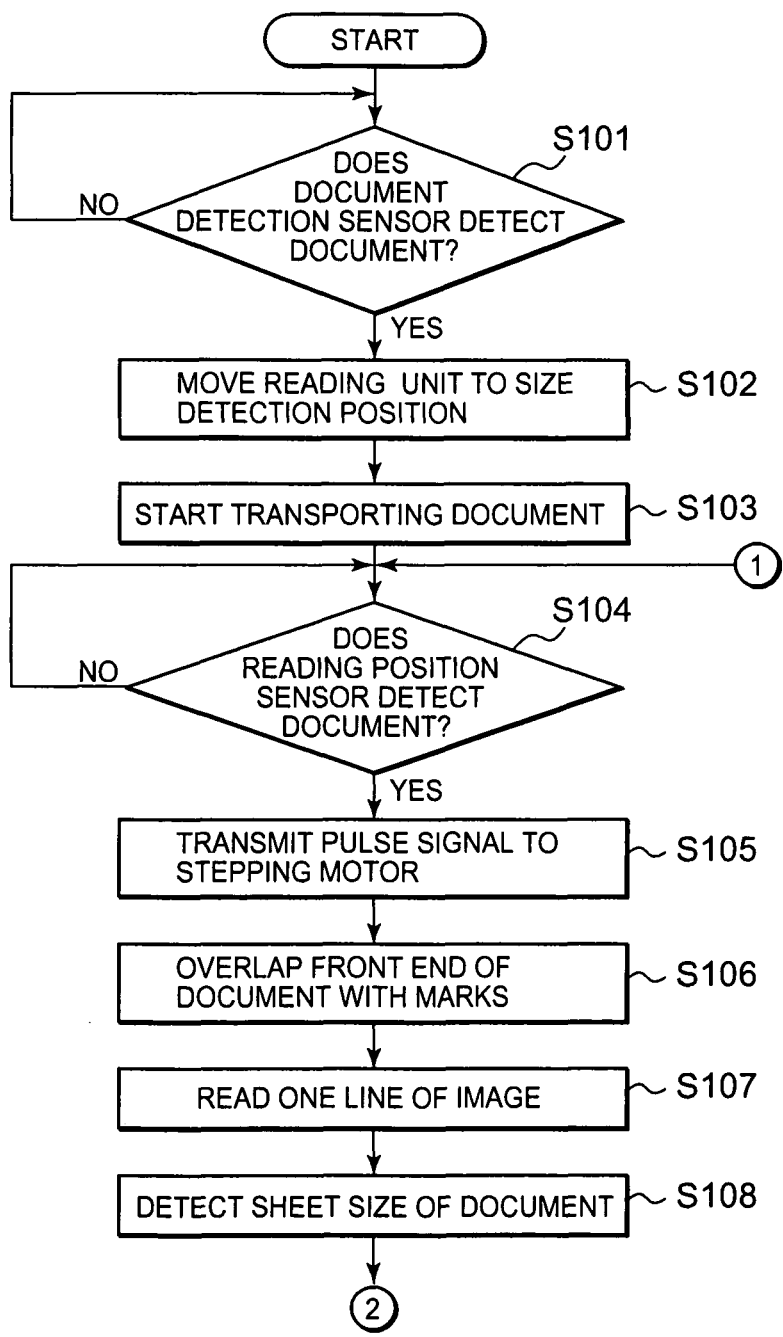
FIG. 8 is a first flow chart of a sheet size detection operation of the scanner of the second embodiment.
Figure 9:
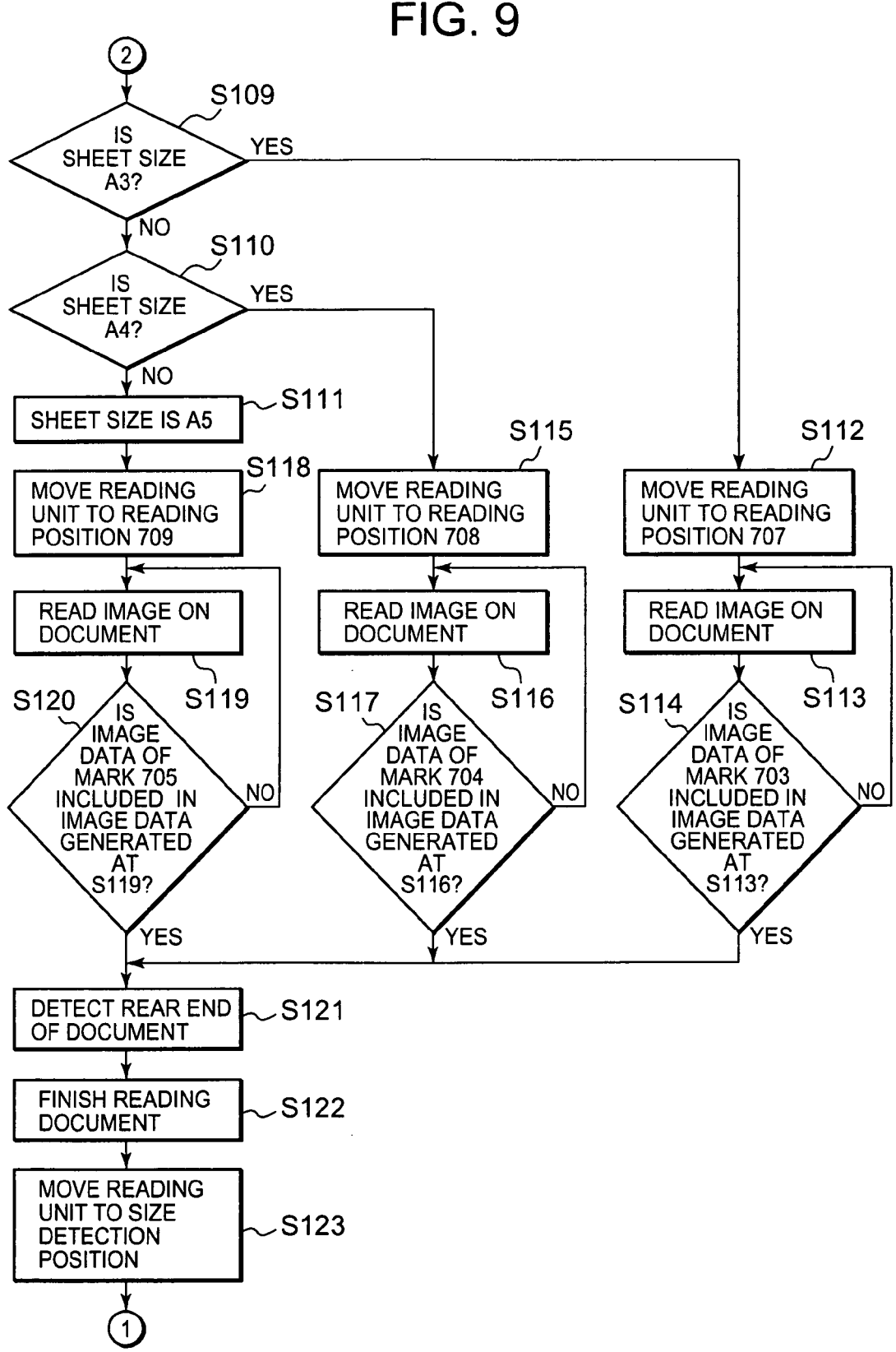
FIG. 9 is a second flow chart of the sheet size detection operation of the scanner of the second embodiment.

Next, a sheet size detection operation of the scanner 601 will be described with reference to FIGS. 8 to 12. FIGS. 8 and 9 are respectively first and second flow charts of the sheet size detection operation of the scanner 601. FIGS. 10A to 10C are diagrams showing the positional relationship among the reading unit 210, an A4 size document 226a and the special sheet 701. FIGS. 11A to 11C are diagrams showing the positional relationship among the reading unit 210, an A3 size document 226b and the special sheet 701. FIGS. 12A to 12C are diagrams showing the positional relationship among the reading unit 210, an A5 size document 226c and the special sheet 701.

At S101, the CPU 5 determines whether or not the document detection sensor 206 detects a front end of the document 226 (226a, 226b or 226c). When the user places the document 226 on the document tray 209, the document detection sensor 206 detects the front end of the document 226 and transmits a detection signal to the CPU 5. Then, the process proceeds to S102. If the document detection sensor 206 does not detect the front end of the document 226, the process returns to S101.

At S102, upon receiving the detection signal from the document detection sensor 206, the CPU 5 commands the transport controller 6 to move the reading unit 210 to the size detection position 702 shown in FIG. 10A, 11A or 12A. The transport controller 6 transmits a pulse signal to the second stepping motor 223 to rotate the pulleys 218. The pulley 218 rotates the drive belt 212 and the reading unit 210 moves to the size detection position 702 in conjunction with the rotation of the drive belt 212.

At S103, when the user inputs a copy start instruction through the operation panel 8, the CPU 5 commands the transport controller 6 to begin transportation of the document 226. The transport controller 6 transmits a pulse signal to the first stepping motor 208 to rotate the feed roller 203. The feed roller 203 begins transporting the document 226.

At S104, the CPU 5 determines whether or not the reading position sensor 207 detects the front end of the document 226. When the reading position sensor 207 detects the front end of the document 226, the reading position sensor 207 transmits a detection signal to the CPU 5. Then, the process proceeds to S105. If the reading position sensor 207 does not detect the front end of the document 226, the process returns to S104.

At S105, upon receiving the detection signal from the reading position sensor 207, the CPU 5 commands the transport controller 6 to move the document 226 to a position where the front end of the document 226 overlaps with the marks 706 on the special sheet 701. The transport controller 6 transmits a pulse signal to the first stepping motor 208 to rotate the transport roller 204.

At S106, the transport roller 204 transports the document 226 to the position where the front end of the document 226 overlaps with the marks 706 on the special sheet 701. FIGS. 10A, 11A and 12A respectively show states where the front ends of the A4 size document 226a, the A3 size document 226b and the A5 size document 226c have overlapped with the marks 706 on the special sheet 701.

At S107, the CPU 5 commands the image-reading unit 2 to read one line of image. The image-reading unit 2 controls the reading unit 210 to read the one line of image and generates one line of image data on the basis of the image read by the reading unit 210. The image-reading unit 2 transmits the image data to the size detector 602.

At S108, the size detector 602 detects the sheet size of the document 226 in the main scanning direction on the basis of the image data transmitted from the image-reading unit 2.

At S109, when the sheet size of the document 226 detected at S108 is A3, which means that the A3 size document 226b has been detected at 108, the process proceeds to S112. Otherwise, the process proceeds to S110.

At S110, when the sheet size of the document 226 detected at S108 is A4, which means that the A4 size document 226a has been detected at 108, the process proceeds to S115. Otherwise, the process proceeds to S111.

At S111, the sheet size of the document 226 detected at S108 is determined as A5, which means that the A5 size document 226c has been detected at 108.

At S112, the transport controller 6 transmits a pulse signal to the second stepping motor 223 to rotate the pulleys 218. The pulley 218 rotates the drive belt 212 and the reading unit 210 moves to the reading position 707 shown in FIG. 11B in conjunction with the rotation of the drive belt 212.

At S113, as shown in FIG. 11C, the image-reading unit 2 controls the reading unit 210 to read an image on the document 226b when the reading unit 210 reaches the reading position 707. Then, the image-reading unit 2 generates image data on the basis of the image.

At S114, the image-reading unit 2 determines whether or not an image data of the mark 703 is included in the one line of image data generated at S113. When the image data of the mark 703 is included in the one line of image data, the process proceeds to S121. Otherwise, the process returns to S113.

At S115, the transport controller 6 transmits a pulse signal to the second stepping motor 223 to rotate the pulleys 218. The pulley 218 rotates the drive belt 212 and the reading unit 210 moves to the reading position 708 shown in FIG. 10B in conjunction with the rotation of the drive belt 212.

At S116, as shown in FIG. 10C, the image-reading unit 2 controls the reading unit 210 to read an image on the document 226a when the reading unit 210 reaches the reading position 708. Then, the image-reading unit 2 generates image data on the basis of the image.

At S117, the image-reading unit 2 determines whether or not an image data of the mark 704 is included in the one line of image data generated at S116. When the image data of the mark 704 is included in the one line of image data, the process proceeds to S121. Otherwise, the process returns to S116.

At S118, the transport controller 6 transmits a pulse signal to the second stepping motor 223 to rotate the pulleys 218. The pulley 218 rotates the drive belt 212 and the reading unit 210 moves to the reading position 709 shown in FIG. 12B in conjunction with the rotation of the drive belt 212.

At S119, as shown in FIG. 12C, the image-reading unit 2 controls the reading unit 210 to read an image on the document 226c when the reading unit 210 reaches the reading position 709. Then, the image-reading unit 2 generates image data on the basis of the image.

At S120, the image-reading unit 2 determines whether or not an image data of the mark 705 is included in the one line of image data generated at S119. When the image data of the mark 705 is included in the one line of image data, the process proceeds to S121. Otherwise, the process returns to S119.

At S121, the image-reading unit 2 determines that the rear end of the document 226 (226a, 226b or 226c) has been reached.

At S122, the image-reading unit 2 finishes reading the document 226 (226a, 226b or 226c).

At S123, the transport controller 6 drives the second stepping motor 223 to return the reading unit 210 to the size detection position 702.

As described above, in the second embodiment, the marks 703, 704 and 705 that are used to detect the rear end of the document 226 are further formed on the special sheet 701 attached to the document guide plate 221, and the reading position of the reading unit 210 is changed on the basis of the size information on the document 226 detected by the size detector 602 in the main scanning direction. Therefore, the scanner is further capable of detecting the sheet size in the sub-scanning direction.

While each embodiment has been described with respect to a scanner as an image reader, the invention may be applicable to any other image reader, such as a facsimile machine, a copier or a multifunction peripheral (MFP) that incorporates a scanner and a printer. Furthermore, although the disclosed second embodiment allows for three types of paper size, alternate embodiments could use more or fewer, simply adjusting the number of marks in the main scanning direction.

The image reader being thus described, it will be apparent that the same may be varied in many ways. Such variations are not to be regarded as a departure from the sprit and scope of the invention, and all such modifications as would be apparent to one of ordinary skill in the art are intended to be included within the scope of the following claims.

What is claimed is:

1. An image reader that reads an image on a document while transporting the document along a transport path, comprising:
   an image-reading unit configured to read the image on the document and generate image data based on the image;
   a size detector configured to detect an actual size of the document from among a plurality of possible sizes;
   a document guide member disposed along the transport path and having a plurality of marks thereon, the plurality of marks extending in a transport direction of the document and having length greater than or equal to a predetermined line width, each of the plurality of marks corresponding to one of the plurality of possible sizes,
   wherein the image-reading unit finishes reading the image on the document when the image-reading unit reads one of the plurality of marks corresponding to the actual size of the document detected by the size detector.

2. The image reader according to claim 1, wherein the image-reading unit moves to a size detection position when the image-reading unit reads the one of the plurality of marks corresponding to the actual size of the document detected by the size detector.

3. The image reader according to claim 1, wherein the plurality of marks includes a first mark corresponding to a first size document and a second mark corresponding to a second size document that is shorter in a main scanning direction than the first size document.

4. The image reader according to claim 3, wherein an end of the first mark and an end of the second mark are separated from each other in the transport direction of the document.

5. The image reader according to claim 4, wherein the second mark is shorter in the transport direction of the document than the first mark.

6. The image reader according to claim 3, wherein the first mark and the second mark are separated from each other in the main scanning direction.

7. The image reader according to claim 6, wherein the second mark is closer to the middle of the transport path in the main scanning direction than the first mark.

8. The image reader according to claim 3, wherein the plurality of marks further includes a third mark corresponding to a third size document that is shorter in the main scanning direction than the second size document.

9. The image reader according to claim 8, wherein the third mark is shorter in the transport direction of the document than the second mark.

10. The image reader according to claim 8, wherein the third mark is closer to the middle of the transport path in the main scanning direction than the second mark.

11. The image reader according to claim 8, wherein the first mark corresponds to an A3 size document, the second mark corresponds to an A4 size document and the third mark corresponds to an A5 size document.

* * * * *